Nov. 12, 1929.   G. D. GARDNER   1,735,242
VARIABLE TIME COOKER
Filed May 22, 1925
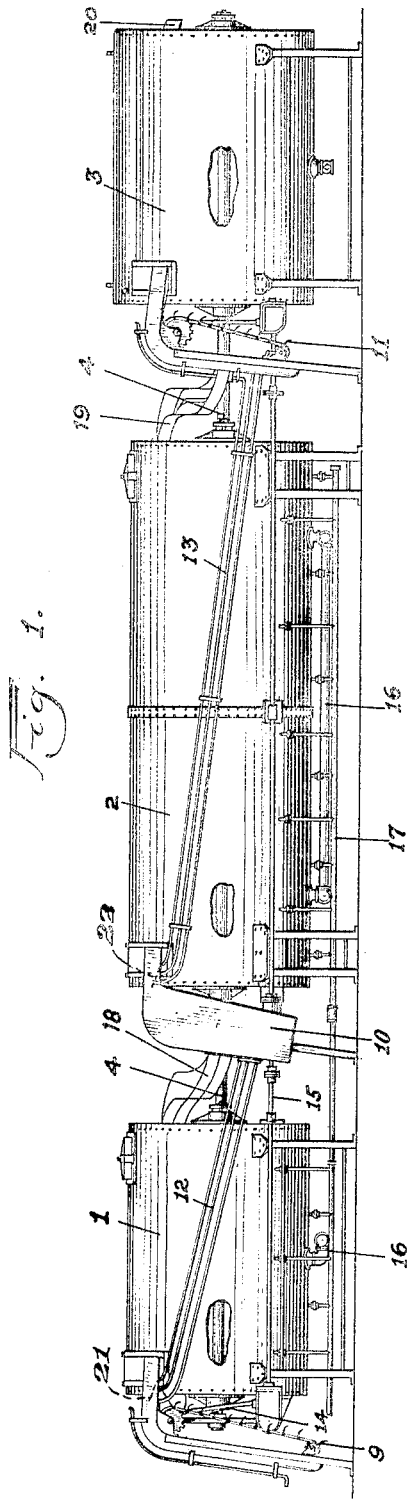
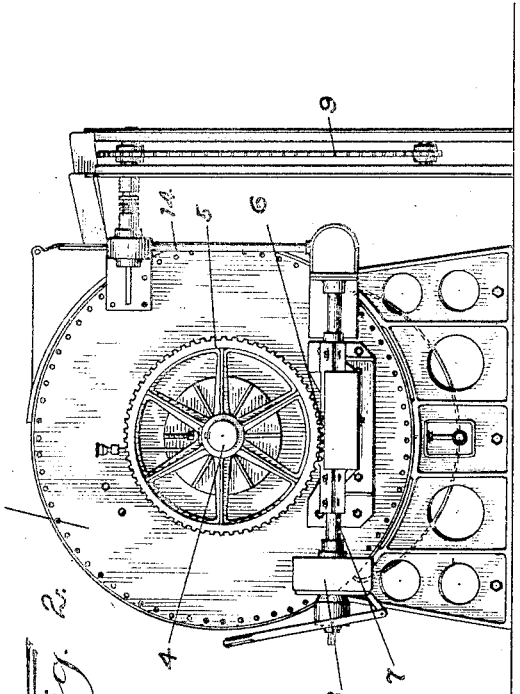

Patented Nov. 12, 1929

1,735,242

UNITED STATES PATENT OFFICE

GEORGE D. GARDNER, OF SAN JOSE, CALIFORNIA, ASSIGNOR TO SPRAGUE-SELLS CORPORATION, OF HOOPESTON, ILLINOIS

VARIABLE-TIME COOKER

Application filed May 22, 1925. Serial No. 32,162.

This invention relates to a method and apparatus for cooking and sterilizing canned goods and pertains to that type of apparatus wherein the hermetically sealed containers are successively passed into and through a closed receptacle and therein subjected to cooking and sterilizing temperatures for the desired time to complete the process.

The invention also relates to that type of apparatus wherein a plurality of cooking and cooling units are assembled in tandem relation and all operated from a single source of power.

For the sterilizing, processing and cooking of canned goods and food products, there at present exists a demand for a method and apparatus, that will permit a canner to mix his product during the cooking operation and vary the time and temperature to suit each product and to pass all through the same set of cooking and cooling units.

It many times happens that a large cannery will have a number of lines running at the same time on different products, and this is especially so during the fruit canning season, when it is desirable to be able to pass the different products through the same cooking apparatus, mixing the different products in groups and vary the temperatures and time of cook to suit each group, without changing the operation of the cooker units.

It is also the case many times where a smaller cannery during a part of the season needs a very large cooking capacity and during other parts of the canning season needs only a small cooking capacity. Separated cooking and cooling units arranged for operation as is disclosed in my present invention makes an ideal arrangement for this type of cannery.

It is therefore a principal object of my invention to provide a method and apparatus for cooking and sterilizing canned goods and food products wherein the cooker units are constructed and assembled as separated compartments whereby any one may be used independently or all used together depending on the requirements of the cannery and the time of year and nature of the products being handled.

It is a further object of the invention to provide a series of comparatively closed compartments arranged in tandem relation and having heat applying means whereby each compartment may be separately heated to provide the suitable temperature for the work in hand.

It is also an object of the invention to have separated cooking compartments of differing size whereby a constant speed of operation may be maintained but a varying time of cook be obtained in the different compartments.

It is also an object of the invention to provide a method and apparatus for the purpose specified having a plurality of sterilizing chambers arranged in tandem relation whereby power may be applied from a single source to operate all of the cooker and cooler units.

It is also an object of the invention to provide a method and apparatus for the purpose specified that will have a plurality of cooker units arranged in tandem relation and to have by-pass means whereby canned foods may be directed in transit to pass through all or any one of the cooker or cooler compartments in the set.

With such objects in view as well as other advantages inherent in the invention, the novel structural peculiarities, novel organization of elements, and the separate and collective operations involved in carrying out my invention, which will be made the subject matter of claims hereto appended, I wish it understood that the several necessary elements and combinations constituting the same may be varied in their proportions, placement, general arrangement and operative relation without departing from the scope and nature of my invention.

In carrying out the objects of my invention in a concrete form of apparatus, further objects, advantages and improvements have been evolved than have been enumerated, and in order to make the invention more clearly understood there are shown in the accompanying drawings, means and mechanism embodying the preferred structural arrangement and the preferred disposition of the different parts and combinations, in which I have simply illustrated one way of embodying the creative part or concept of the invention in a concrete form of apparatus, and in so doing I do not wish to limit the claims to the exact details of construction shown. The described devices are simply embodiments of the invention which other structures might also employ and some of the parts and combinations of parts may be used without the others in different types of such apparatus without departure from the purview of my invention and I regard myself as entitled to such variations from the shown and described devices as fall within the scope and meaning of the claims hereto appended.

In referring now to the drawings accompanying this application where a clearer and better understanding of the general arrangement and operation of the apparatus will be had, I want to point out that these drawings are more or less diagrammatic in character; are not necessarily made to scale, neither do they necessarily represent the best or the preferred engineering practices in connection with the construction of this type of apparatus, also that the proportions and relations of some of the parts may be more or less exaggerated in size and shape to better illustrate the application of the invention to an operative apparatus.

Figure 1 is a side elevation of an apparatus embodying my invention, arranged in tandem relation, showing the manner of operating the several sterilizing compartments from a single source of power; the means for transferring canned product from one compartment to another, or for shunting it around any one or more compartments and then passing it through a cooling compartment or compartments.

Figure 2 is an end elevation of the apparatus of Fig. 1 looking from the left end of the machine and showing only the parts at that end.

The method part of this invention consists in the arrangement of the apparatus whereby any one or all of the cooking and cooling compartments may be used independently or cojointly as may be desired; whereby different products and different size containers may be handled simultaneously and whereby temperatures and time of cook may be adjusted to suit each individual product.

The apparatus part of the invention comprises the placing of a series of cooking and sterilizing compartments in tandem relation whereby all may be driven from a single source of power application, in connection with cooling means also in tandem relation with the cooking means; with by-pass means whereby canned product may be shunted around any one or more of the cooking compartments, or passed in succession through all of them; with means for adjusting the cooking temperatures in the various compartments to suit the conditions of the time and the material being handled.

Since this invention consists essentially of the arrangement and operative relation of the several cooking and sterilizing units, and one or more cooling units all operative from a single source of power, I will not offer any detailed description of the interior of the cooking compartments or the means employed to convey the canned product therethrough. Any of the well known ways of transporting filled containers through cooking compartments may be employed, such as a spiral track secured to the inner walls of the compartment, and a rotor element having longitudinally spaced channels around its periphery for receiving and conveying the cans in a circular direction while the spiral track will gradually convey them in a longitudinal direction.

The numerals 1, 2 and 3 represent respectively two cooker or sterilizing chambers and a cooling chamber.

4 represents the longitudinal drive shaft extending from end to end of the apparatus. 5 is a worm gear on the end of the shaft at the drive end and 6 is a driving worm carried in suitable housing and 7 the worm drive shaft which carries a clutch pulley 8. 9, 10 and 11 represent respectively elevating conveyors at the entrance end of each cooking and cooling compartment. 12 and 13 represent inclined runways connecting the elevators 9, 10 and 11. The elevators 9, 10 and 11 are driven by means of the shafts 14 and 15 as best shown in Fig. 1, as suitable gear connections transmit power and motion to the elevators.

Cookers of this type usually carry some steam pressure, and in this instance steam under suitable pressure is supplied through the pipes and connections 16, and drainage is provided by means of the pipes and connections 17.

Valves of the revolving door type are provided in either end of each compartment to admit cans in single file arrangement and permit them to pass out of the compartment in the same manner without appreciable loss of pressure or heat from the interior of the compartments.

In the drawings I have shown only two cooking compartments and one cooling compartment. It is obvious, however that I may construct an apparatus having as many cooking and cooling compartments as may be desired to handle the product most economically in each individual cannery.

Having thus given a brief description of the construction and arrangement of an apparatus as shown in the drawings I will now proceed with a description of the operation of such an apparatus. This description will substantially fit an apparatus as shown but may differ materially in an apparatus having a greater number of tandem units.

*Operation*

It will be noticed by reference to the drawings that the apparatus as shown comprises two cooker units of different longitudinal size. This arrangement gives means for three different time periods of cook. For such product as requires only a short time of cook, the first compartment 1 may be sufficient. The canned product would be carried to the conveyor 9 and thereby elevated to the top of the compartment 1 and passed into the compartment in the manner described and as the cans reached the exit end of the compartment they would pass out of the exit into the runway 18 and pass into the conveyor 10 where they would be elevated. but instead of passing into the compartment 2 a suitable trap door 21 in the entrance to the runway 13 would be set to permit them to pass into the runway 13 and pass to the conveyor 11 where they would be conveyed to the cooler 3.

A product that requires about twice the time period of cook than the one just described would follow a different course. The cans coming in single file arrangement would be received by the elevator 9 and elevated, but instead of passing into the cooker compartment 1 as the other batch did, a suitable trap door 22 in the top of the elevator would be adjusted to pass the cans into the runway 12 where they would roll to the elevator 10 and be conveyed up and into the cooking compartment 2 and after passing through this compartment, and getting practicallly twice the cook that the previous batch had, would pass into the runway 19, into the elevator 11 and be passed into the cooler 3.

A product that would require the maximum time period cook that this particular apparatus is capable of would receive cans in the first compartment as previously described, from which they would pass into the second compartment, 2, and then into and through the cooler passing out of the apparatus at 20 and be handled therefrom in any desirable manner.

With the three compartments arranged and operated as just described, and by a further control of the temperatures in each compartment quite a variety of time periods may be given to various products. Raising or lowering the temperatures within permissible limits is the equivalent of longer or shorter time periods. By having the cooking compartments arranged as separate units, as it were, it is possible to start the cooking operation at either a high or low temperature as may be desired, and to end the cook at either a high or low temperature, while products requiring a long time cook at a low temperature would be passed through both compartments, or if a product required a long time cook at a high temperature it too would be passed through both compartments at a high temperature.

For products that require a still longer time at either a high or low temperature, than this apparatus will give, more cooking compartments would be provided in the construction of the apparatus.

When it comes to handling different kinds of product in the same cooker during the same day a somewhat different procedure would be adopted. In this case it would be necessary to handle the different products in groups. Thus two kinds of fruit might be handled simultaneously in the canning plant. One kind run through the cooker for a given period and then the other kind for a given period and thus by alternating the two products would be handled during the day with just the one cooker installation. Or if runway storage capacity was available a stock of canned goods could be run into such storage as it came from the canning line while a batch of the other product could be run into the cooker line and the two batches so alternated that a constant stream of cans would be passing through the cooker of what might be termed mixed sizes.

There may be other methods of handling canned product by means of an apparatus of this type, but the different methods I have enumerated will enable anyone skilled in the art to get almost any results desired.

Having thus described my invention what I claim as new and desire to secure by Letters Patent is:

1. An apparatus for treating canned goods comprising a series of treating compartments arranged in connected operative relation, a plurality of can ways located adjacent said compartments, and providing separate and distinct paths for the travel of cans relative to said compartments, said canways being so arranged that the travel of cans may be directed through said compartments or may be shunted around a part of said compartments.

2. An apparatus for treating canned goods comprising a plurality of treating units arranged in operative relation, a plurality of interconnected canways arranged in operative relation with said treating units and so located relative thereto to permit the movement of cans through all of said treating units or the shunting of cans around some of said treating units.

3. An apparatus for treating canned goods comprising a plurality of treating units arranged in tandem relation, a plurality of canways located adjacent said treating units, for the movement of cans into or around a part of said units, said canways comprising means for changing the elevation of said cans during their travel therethrough and with means for changing the direction of travel of said cans.

4. An apparatus for treating canned goods comprising a plurality of treating units arranged in tandem relation and having means therein for moving cans successively therethrough, said means receiving motion from a common source of power, means located outside of said treating units for conveying cans into any or all of said units or for shunting said cans around any or all of said units except one.

5. An apparatus for treating canned goods comprising a series of treating units connected for successive operation on a line of moving cans, each of said units having independent inlet and outlet means, an elevator at each inlet with interconnecting gravity runways therebetween and means connecting said outlets with each of said elevators.

6. An apparatus for treating canned goods comprising a plurality of treating units arranged in tandem relation adapted to operate successively on a line of moving cans, each of said units having inlet and outlet means, means for elevating cans to the tops of said units for the distribution of cans thereto, with means for shunting the line of cans around any one or all of said units except the last one.

7. An apparatus for treating canned goods comprising a plurality of treating units arranged in tandem relation and adapted to operate successively on a line of moving cans, an elevator at the inlet of each of said units having a discharge that will direct the line of cans into the adjacent unit or shunt the line of cans around said unit.

8. An apparatus for treating canned goods comprising a plurality of treating units arranged in operative relation and adapted to operate successively on a line of moving cans, means at each inlet to said units for elevating the line of cans, with transfer means for directing the line of cans into the adjacent unit or for shunting the line of cans around said unit.

9. A means for treating canned goods comprising a treating means and a plurality of conveying means, said conveying means comprising a series of canways and transfer stations, means at each transfer station for directing the line of cans into the said treating means or around the said treating means, said conveying means comprising power driven means and gravity means.

10. A means for treating canned goods comprising a series of treating means, a trunk canway for conveying cans outside of and parallel with said treating means, transfer means at the inlet of each of said series of treating means for shunting the line of moving cans into any one or all of said treating means or for directing the line of cans past any or all of said treating means except the last one of the series.

11. A means for treating canned goods comprising a series of treating means, a trunk canway for directing cans outside of and parallel with said treating means, interconnecting canways for carrying the line of cans into any one or all of said series of treating means and to return the line of cans to the said trunk canway for further distribution, but passing all cans through the last of the series of treating means.

12. In an apparatus of the character described, a series of units for treating canned goods, a passage adjacent a unit, means for conveying cans into said unit and having means for optionally shunting the cans onto the passage.

13. In an apparatus of the character described, a series of units for treating canned goods, an inclined passage adjacent a unit for gravitally conducting cans, means for conveying cans into said unit and having means for optionally shunting the cans onto the passage.

14. In an apparatus of the character described, a series of units for treating canned goods, a passage adjacent each of two consecutive units, means for conveying cans into the first of said units and having means for optionally shunting the cans onto the passage adjacent the unit, means for conveying cans from said passage into the second of said units and having means for optionally shunting the cans onto the passage adjacent the second unit, and a passage for receiving cans from the first unit and depositing them onto the conveying means for the second unit.

15. In an apparatus of the character described, a series of units for treating canned goods, an inclined passage adjacent each of two consecutive units for gravitally conducting cans, means for conveying cans into the first of said units and having means for optionally shunting the cans onto the passage adjacent the unit, means for conveying cans from said passage into the second of said units and having means for optionally shunting the cans onto the passage adjacent the second unit, and an inclined passage for receiving cans from the first unit and gravitally conducting them onto the conveying means for the second unit.

16. In an apparatus of the character described, a series of units for treating canned goods, a canway adjacent a unit for conducting the cans therepast, means for conveying cans into said unit and having means for optionally shunting the cans onto the canway, and a can-path connecting said unit with the unit adjacent thereto.

17. In an apparatus of the character described, a series of units for treating canned goods, a canway adjacent a unit for conducting the cans therepast, means for conveying cans into said unit and having means for optionally shunting the cans onto the canway, and a can-path connecting said unit with the unit adjacent thereto, said canway communicating with the can-path.

18. In an apparatus for treating packaged goods, a plurality of drums, means for conveying packages thru each of said drums, means connecting adjacent drums for conducting the packages from one drum to the other, and means for conducting the packages past a selected number of the drums into a selected drum.

In testimony whereof I affix my signature.

GEORGE D. GARDNER.